US006891604B2

(12) United States Patent
Todome

(10) Patent No.: US 6,891,604 B2
(45) Date of Patent: May 10, 2005

(54) IMAGE FORMING APPARATUS AND PAPER FEED CONTROL METHOD FOR IMAGE FORMING APPARATUS

(75) Inventor: Tsuyoshi Todome, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/937,412

(22) Filed: Sep. 10, 2004

(65) Prior Publication Data

US 2005/0030517 A1 Feb. 10, 2005

Related U.S. Application Data

(63) Continuation of application No. 10/320,400, filed on Dec. 17, 2002, now Pat. No. 6,801,304.

(51) Int. Cl.[7] .......................... G03B 27/00; G03B 27/52
(52) U.S. Cl. .......................................... 355/407; 355/40
(58) Field of Search .......................... 355/40, 405, 407, 355/75; 271/38, 110; 358/406

(56) References Cited

U.S. PATENT DOCUMENTS

| | | | |
|---|---|---|---|
| 4,469,320 | A | 9/1984 | Wenthe, Jr. |
| 4,770,403 | A | 9/1988 | Katsumata et al. |
| 5,700,003 | A | 12/1997 | Sung |
| 5,812,280 | A | 9/1998 | Kwan-Bo |
| 5,836,580 | A | 11/1998 | Hansen et al. |

FOREIGN PATENT DOCUMENTS

| | | |
|---|---|---|
| JP | 10-148982 A | 6/1998 |

*Primary Examiner*—Henry Hung Nguyen
(74) *Attorney, Agent, or Firm*—Foley & Lardner LLP

(57) ABSTRACT

An image forming apparatus includes a paper storage part; weight sensors for measuring the weight of paper stored in the paper storage part; a paper feed counting part for counting the number of sheets fed from the paper storage part; a memory unit for storing the weight A applied to the weight sensors, exclusive of the weight of paper, the weight B of standard paper, and the set number C of sheets for checking that specifies the intervals at which the remaining quantity of paper is to be checked; a control panel; and a CPU. The CPU accurately calculates the actual weight of each sheet of paper from a change in paper weight per feed of the set number C of sheets for checking.

14 Claims, 4 Drawing Sheets

IMAGE FORMING APPARATUS AND PAPER FEED CONTROL METHOD FOR IMAGE FORMING APPARATUS

The present application is a continuation of U.S. Application Ser. No. 10/320,400, filed Dec. 17, 2002 now U.S. Pat. No. 6,801,304, the entire contents of which are incorporated herein by reference.

BACKGROUND OF THE INVENTION

1. Field of the Invention

The present invention relates to an image forming apparatus and a paper feed control method for an image forming apparatus. More particularly, the present invention relates to an image forming apparatus capable of paper feed control while accurately detecting the weight of each sheet of paper stored in a paper storage part or the weight per unit number of sheets stored therein and further capable of judging, for example, whether or not the number of sheets remaining in the paper storage part is adequate for the designated number of copies to be made, and of displaying the result of the judgment. The present invention also relates to a paper feed control method for such an image forming apparatus.

2. Description of the Related Art

In the conventional image forming apparatus of the type described above, the detection of the remaining quantity of copying paper held in a paper storage part (paper feed cassette) cannot very accurately be performed. For example, the invention disclosed in Japanese Patent Application Unexamined Publication (KOKAI) No. Hei 10-148982 detects the amount of upward movement of the paper storage part by counting the number of motor pulses. On the other hand, the number of images formed is counted with a paper counting means to calculate the amount of upward movement per unit number of sheets of paper, and the number of remaining sheets is calculated from the amount of upward movement left.

The above-described conventional image forming apparatus uses the motor pulses to calculate the remaining quantity of paper. However, it is not easy to make the motor pulse accuracy correspond to the thickness of thin paper. The accuracy degrades particularly when sheets of paper different in thickness are used mixedly or when the reverse sides of used sheets are used, by way of example. When the accuracy of the calculation of the remaining quantity of paper is low, a problem may occur when the user leaves the place where the image forming apparatus is placed after setting and executing a copying operation for making a large number of copies. That is, when the user returns to the place, the desired copying operation may have undesirably been suspended because of a lack of paper.

SUMMARY OF THE INVENTION

The present invention was made to solve the above-described problems. Accordingly, an object of the present invention is to provide an image forming apparatus and a paper feed control method for an image forming apparatus capable of automatically performing the following operations: The number of copies made is counted, and every time a specific number of copies have been made, the weight of paper in the paper storage part is detected, whereby the weight per unit number of sheets of paper actually used can be accurately calculated from a specific decrease in the number of sheets in the paper storage part and a reduction in the weight. Thus, the number of sheets of paper remaining in the paper storage part can be accurately calculated on the basis of the result of the above calculation. Further, it is judged whether or not the number of remaining sheets of paper is adequate for the number of copies to be made. If the number of remaining sheets of paper is not adequate for the number of copies to be made, a warning is given.

To solve the above-described problems, the present invention provides an image forming apparatus having a paper storage part for storing sheets of paper for use in copying; a weight detecting part for detecting the weight of sheets of paper stored in the paper storage part a paper feed counting part for counting sheets of paper fed for copying from the paper storage part; a checking sheet number setting part for setting a number of sheets for checking as a predetermined number of sheets of paper used to check a predetermined parameter concerning sheets of paper; and a weight calculating part for comparing the weights of sheets of paper detected by the weight detecting part before and after the paper feed counting part counts the number of sheets of paper fed equal to the number of sheets for checking to detect a decrease in weight of the sheets of paper, and for calculating the weight per sheet of paper or per unit number of sheets of paper on the basis of the decrease in weight and the number of sheets for checking.

Further, the image forming apparatus according to the present invention has a designating part for designating a number of copies to be made; a calculating part for calculating the number of remaining sheets of paper in the paper storage part on the basis of the weight per sheet of paper or per unit number of sheets of paper calculated by the weight calculating part and the weight of sheets of paper detected by the weight detecting part; and a judging part for judging whether or not the number of remaining sheets of paper calculated by the calculating part is adequate for the number of copies to be made designated by the designating part on the basis of the number of remaining sheets of paper and the number of copies to be made.

In this case, the image forming apparatus may have a warning display part for giving warning when the judging part judges that the number of remaining sheets of paper is not adequate for the number of copies to be made. The warning display part may include at least either a sound output unit for giving warning by sound or a control panel for displaying warning by an image.

Further, the image forming apparatus according to the present invention may have a memory part for storing the weight of standard paper, which is the weight per sheet of standard paper or per unit number of sheets of standard paper, and a calculating part for calculating the number of remaining sheets of paper stored in the paper storage part from the weight of sheets of paper detected by the weight detecting part and the weight of standard paper when the number of copies to be made is designated by the designating part at the time of starting. The number of sheets for checking set in the checking sheet number setting part may be changeable from the outside. Further, when the number of copies to be made designated by the designating part is smaller than the number of sheets for checking set in the checking sheet number setting part, the number of copies to be made can be set substitutionally in the checking sheet number setting part as the number of sheets for checking.

In the present invention, the weight detecting part comprises a weight sensor placed in the bottom of the paper storage part a paper support plate supported by the weight sensor and loaded with paper, and a weight calculating part for reading the weight of the paper support plate that has previously been stored in memory and for subtracting the weight of the paper support plate from the weight of paper detected with the weight sensor to determine the weight of paper.

In addition, the present invention provides a paper feed control method for an image forming apparatus adapted to form an image on a sheet of paper fed from a paper storage part, wherein paper feed control is performed by carrying out steps including: a first paper weight detecting step of detecting the weight of sheets of paper stored in the paper storage part; a counting step of counting sheets of paper fed for copying from the paper storage part from a point of time at which weight detection is effected by the first paper weight detecting step; a second paper weight detecting step of detecting the weight of sheets of paper stored in the paper storage part when a predetermined number of sheets of paper fed has been counted by the counting step; and a weight calculating step of calculating the weight per sheet of the paper or per unit number of sheets of the paper on the basis of the weight of sheets of paper detected by the first paper weight detecting step and the weight of sheets of paper detected by the second paper weight detecting step, together with the predetermined number of sheets of paper.

In this case, the paper feed control method may include a remaining sheet number calculating step of calculating the number of remaining sheets of paper in the paper storage part on the basis of the weight per sheet of the paper or per unit number of sheets of the paper calculated by the weight calculating step and the weight of sheets of paper detected by the second paper weight detecting step.

Further, in this case, the paper feed control method may include a judging step of judging whether or not the calculated number of remaining sheets of paper is adequate for the designated number of copies to be made on the basis of the number of remaining sheets of paper and the designated number of copies to be made.

With the above-described arrangement, the number of copies made is counted, and every time a specific number of copies have been made, the weight of paper in the paper storage part is detected, whereby the weight per unit number of sheets of paper actually used can be accurately calculated from a specific decrease in the number of sheets in the paper storage part and a reduction in the weight. Thus, the number of sheets of paper remaining in the paper storage part can be accurately calculated on the basis of the result of the above calculation. Further, it is judged whether or not the number of remaining sheets of paper is adequate for the number of copies to be made. If the number of remaining sheets of paper is not adequate for the number of copies to be made, a warning is given. These operations can be performed automatically

DESCRIPTION OF THE PREFERRED EMBODIMENTS

Embodiments of the present invention will be described below with reference to the accompanying drawings.

Figure 1:
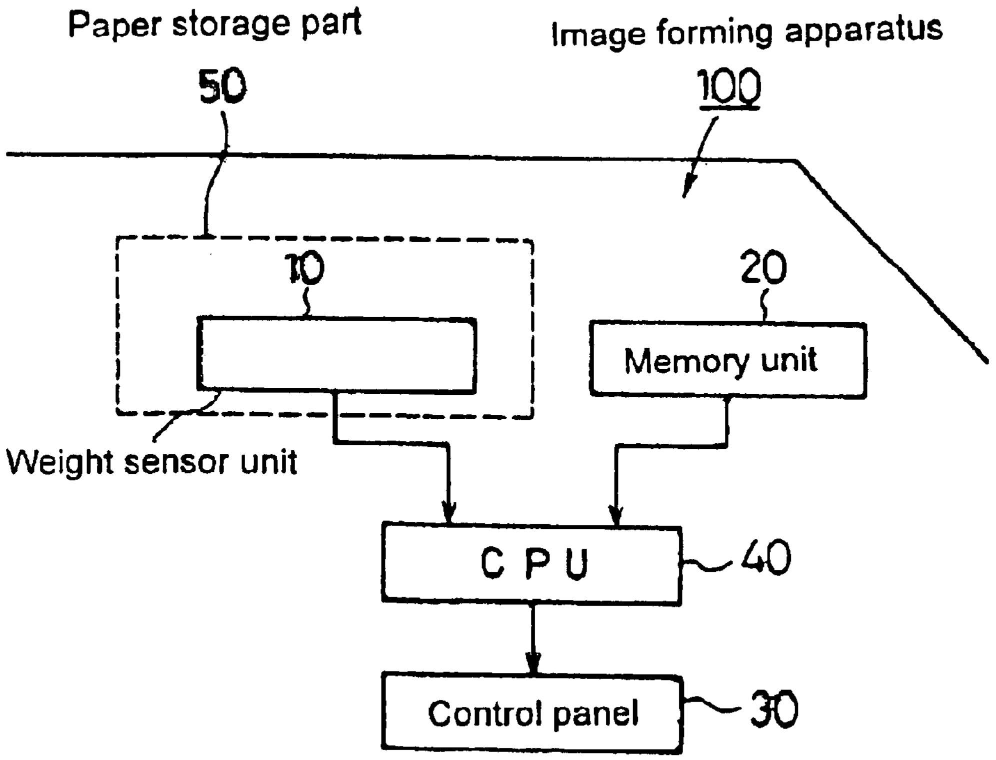
FIG. 1 is a block diagram showing an embodiment of the image forming apparatus according to the present invention.

An image forming apparatus 100 in FIG. 1 performs control concerning the desired number of copies to be made and the number of sheets of paper stored in a paper storage part 50 by using a weight sensor unit 10 placed in the paper storage part 50, a memory unit 20, a control panel 30, a CPU 40, and a paper feed counting unit (not shown).

Figure 2:
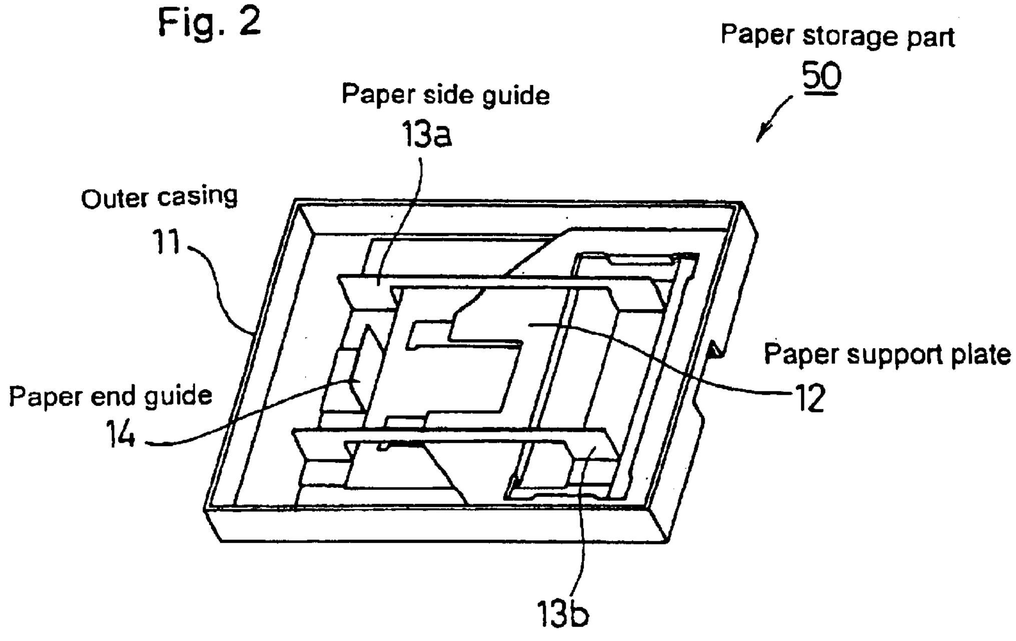
FIG. 2 is an external view for explaining a paper storage part of the image forming apparatus in FIG. 1, in which weight sensors are mounted.
Figure 3:
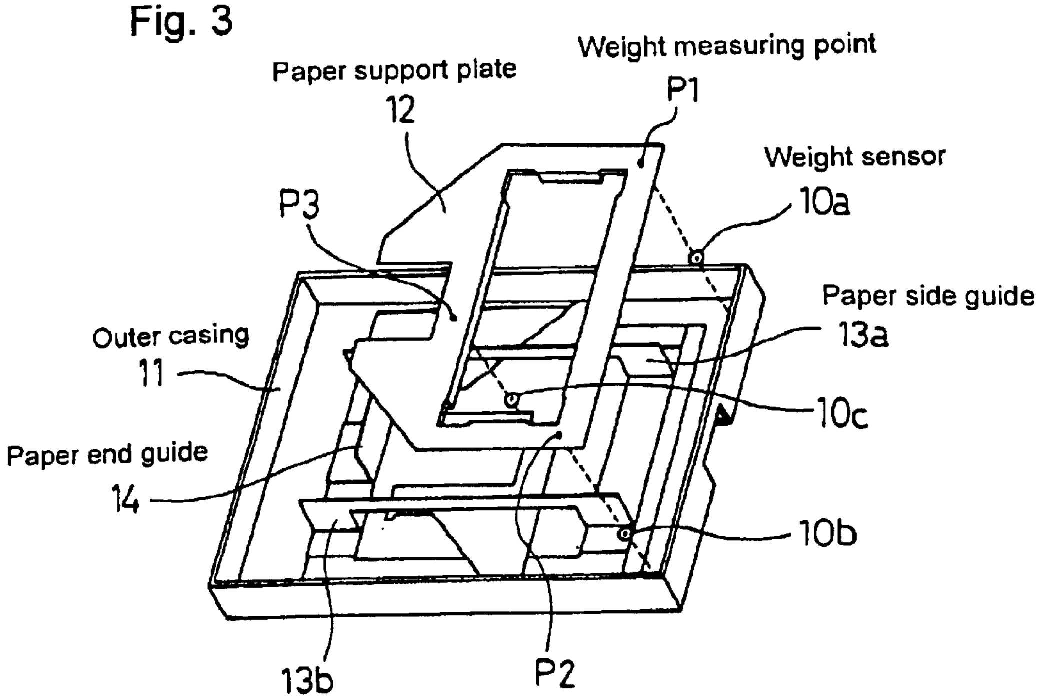
FIG. 3 is an external view for explaining the relationship between the weight sensors and a paper support plate fitted in the paper storage part shown in FIG. 2.

As shown in FIGS. 2 and 3, the paper storage part (paper feed cassette) 50 has an outer casing 11 in the shape of a rectangular parallelepiped, the top of which is open; a paper support plate 12 for supporting copying paper stored in the paper storage part 50; paper side guides 13*a* and 13*b* for guiding the side edges of paper placed on the paper support plate 12; a paper end guide 14 for guiding the inner end edge of paper; and three weight sensors 10*a*, 10*b* and 10*c* (e.g. strain gauges) constituting a weight sensor unit 10, which are mounted in the bottom of the paper storage part 50 in such a manner as to support the paper support plate 12.

Figure 4A:
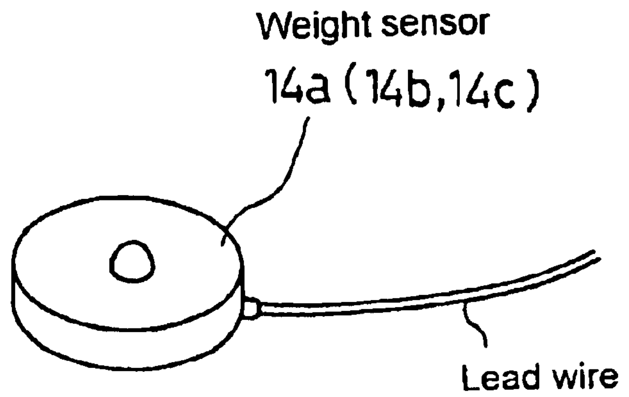
FIG. 4(A) is an external view illustrating in detail a weight sensor shown in FIGS. 1 and 3.
Figure 4B:
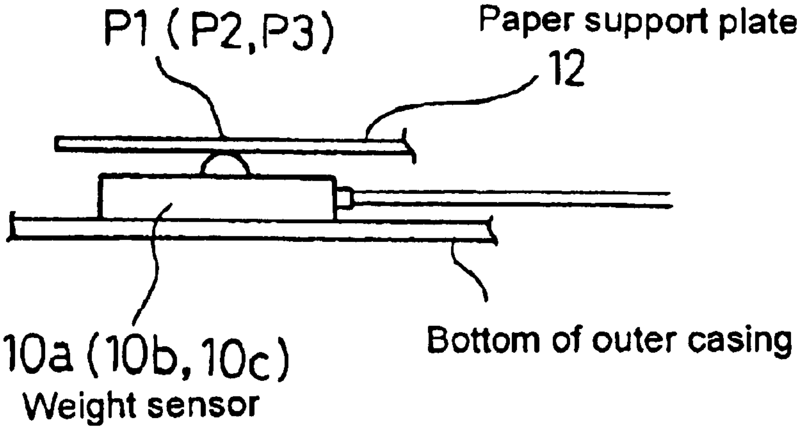
FIG. 4(B) is a diagram showing the relationship between the weight sensor and the paper support plate.

In the above-described arrangement, as will be dear from FIGS. 3 and 4(B), the weight sensors 10*a*, 10*b* and 10*c* are mounted so as to be positioned underweight measuring points P1, P2 and P3, respectively, of the paper support plate 12. Thus, the sum total of the weight of the paper support plate 12 and the weight of paper placed thereon is detected with the weight sensors 10*a*, 10*b* and 10*c*. The CPU 40 can calculate the weight of the paper from these pieces of data. The paper side guides 13*a* and 13*b* and the paper end guide 14 are slidable toward the center or sideward so as to conform to the size of copying paper placed on the paper support plate 12. In particular, the paper side guides 13*a* and 13*b* are arranged to slide in opposite directions to each other.

Figure 5:
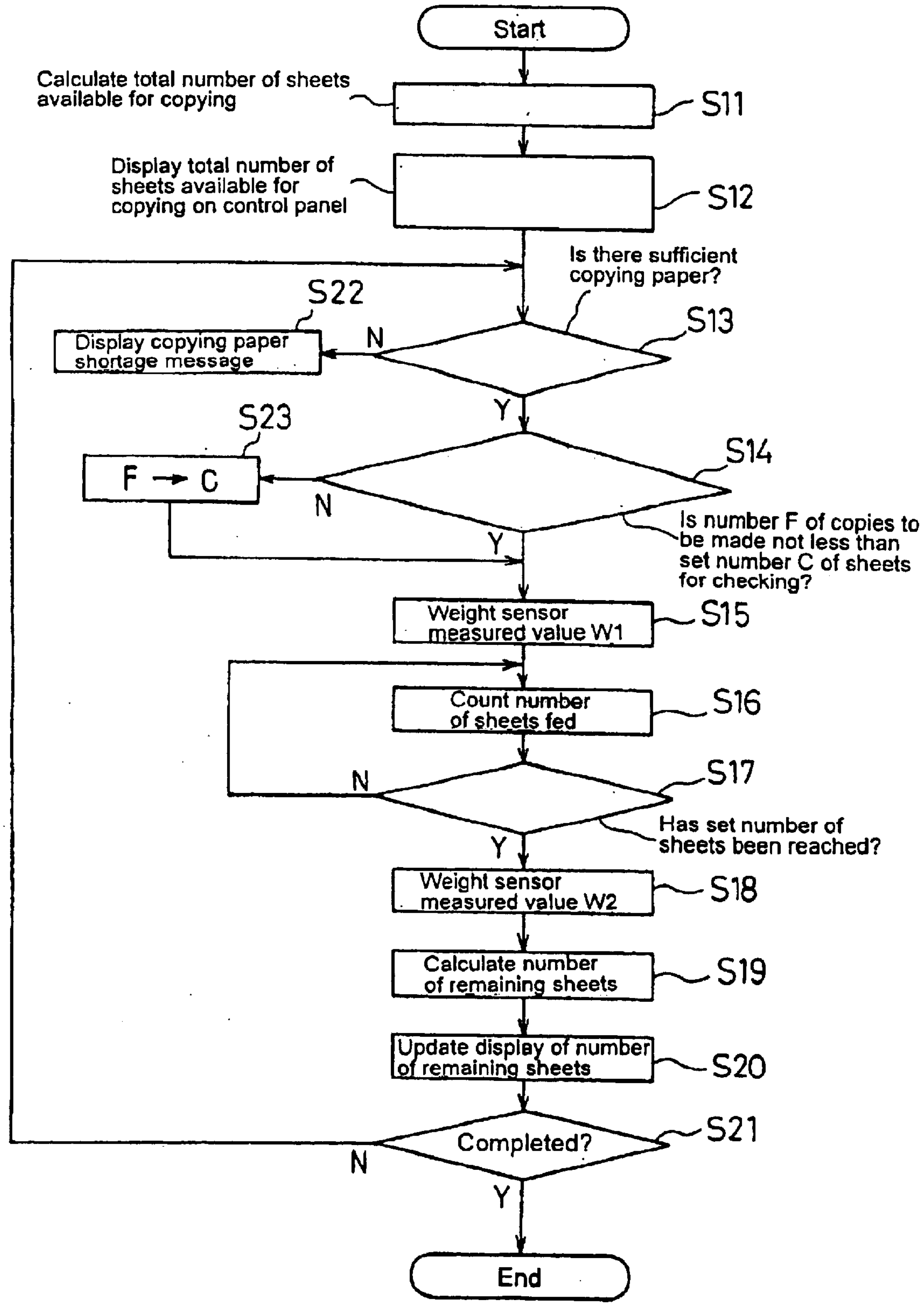
FIG. 5 is a flowchart for explaining the control operation of a CPU in FIG. 1.

The control operation of the CPU 40 in the image forming apparatus 100 shown in FIG. 1 will be described with reference to FIG. 5. The memory unit 20 of the image forming apparatus 100 has previously been stored with data concerning the weight A of the paper support plate 12, the standard paper weight B per sheet of recommended copying paper for use in copying, and a set number C (e.g. 50) of sheets for checking the remaining quantity of paper in the paper storage part 50, i.e. the number of sheets specifying the intervals at which the remaining quantity of paper is to be checked. When the power source is turned on in a state where some sheets of copying paper have been stored in the paper storage part 50, the CPU 40 calculates the weight Da of the remaining copying paper, which is the weight of copying paper remaining in the paper storage part 50, according to the following equation (1) on the basis of the paper storage part overall weight Ya, which is the overall weight of the paper storage part 50 detected with the weight sensors 10*a*, 10*b* and 10*c*. Further, the CPU 40 calculates an estimated number E of sheets available for copying from the calculation result according to the following equation (2) (S11). Then, the CPU 40 displays the calculated estimated number E of sheets available for copying on the control panel 30 (S12).

$$Da=Ya-A \tag{1}$$

$$E=D+B \tag{2}$$

In this case, the calculation of equation (1) is not needed if the outputs of the weight sensors 10*a*, 10*b* and 10*c* have previously been corrected so that the detected value (measured value) obtained with the weight sensors 10*a*, 10*b* and 10c is measured less by the weight A of the paper support plate 12, as a matter of course. As the weight sensors 10a, 10b and 10c, those capable of measuring weight in units of milligrams should preferably be used. However, weight sensors measuring weight in units of grams may be used without a problem. Although three weight sensors 10a, 10b and 10c are used in the above, it is also possible to carry out the present invention with more or less than three weight sensors. For example, the arrangement may be such that the front portion of the paper support plate 12 is supported with a rotary mechanism capable of rotating freely in place of the weight sensors 10a and 10b, and the weight of paper is measured with the weight sensor 10c. Alternatively, the arrangement may be such that the rear portion of the paper support plate 12 is supported with a rotary mechanism capable of rotating freely in place of the weight sensor 10c, and the paper weight is measured with the weight sensors 10a and 10b. It is also possible to use a weight calculating circuit provided separately to calculate the weight Da of the remaining copying paper instead of using the CPU 40.

Next, the CPU 40 requests the operator through the control panel 30 to designate a number p of pages to be copied and a number q of copies to be made. When the numbers p and q are given, the CPU 40 calculates a total number F of copies to be made according to the following equation (3):

$$F=p*q \quad (3)$$

The CPU 40 calculates the estimated number G of sheets of copying paper remaining after copying has been performed a number of times equal to the total number F of copies to be made according to the following equation (4):

$$G=E-F \quad (4)$$

Then, the CPU 40 judges whether or not G>0, that is, whether or not the number of sheets of paper presently stored in the paper storage part 50 is sufficient for making the designated number F of copies (S13; in this case, it is, needless to say, possible to use G>α, where α may be 20, for example, taking into account an error). If the condition of G>0 is not satisfied, it means that there are not enough sheets of paper. In such a case, the CPU 40 displays a copying paper shortage message on the control panel 30 and waits for an instruction from the operator (S22). In this case, it is also preferable to generate an alarm sound.

In this embodiment if the condition of G>0 is satisfied in the above case, it is, first, judged whether or not the number F of copies to be made is at least equal to the set number C of sheets for checking (F≧C) (S14). If it is judged that the number F of copies to be made is not smaller than the set number C of sheets for checking, it is checked whether or not a first weight sensor measured value W1 has already been stored in the memory unit 20. If it has not yet been stored, the weight Da of copying paper remaining in the paper storage part 50 before starting of copying is stored into the memory unit 20 as a first weight sensor measured value W1 (S15). Thereafter, copying is started. The paper feed counting unit (not shown) is instructed to count the number of sheets fed for copying from the paper storage part 50 (S16), and it is judged whether or not the count has reached the set number C of sheets for checking (S17). If the count has not yet reached the set number C of sheets for checking, the counting operation is repeatedly continued. When the count has reached the set number C of sheets for checking, the weight Db of the remaining copying paper is calculated from the following equation (5) by using the paper storage part overall weight Yb, which is the overall weight of the paper storage part 50 detected with the weight sensors 10a, 10b and 10c at this point of time.

$$Db=Yb-A \quad (5)$$

The weight Db is stored into the memory unit 20 as a second weight sensor measured value W2 (S18).

Then, the CPU 40 calculates the actual weight S per sheet of copying paper according to the following equation (6), and further calculates the number T of sheets remaining in the paper storage part 50 after the completion of the copying process from the second weight sensor measured value W2 after copying has been performed a number of times equal to the set number C of sheets for checking according to the following equation (7)(S19):

$$S=(W1-W2)+C \quad (6)$$

$$T=W2+S \quad (7)$$

On the basis of the result of the calculation according to equation (6), the data displayed on the control panel is updated by using the number T of remaining sheets of copying paper in the paper storage part 50 as a new number E of sheets available for copying, and the weight sensor measured value W2 is stored into the memory unit 20 as a weight sensor measured value W1 for the subsequent copying operation (S20). Then, it is judged whether or not the designated number of copies have been made (S21). If it has not yet been completed, the control process returns to step S13. Then, the subsequent copying operation for the set number C of sheets for checking is performed, and the same operation as the above is repeated. However, if it is judged at step S20 that the designated number of copies have been made, the copying operation is terminated.

If it is judged at the above-described step S14 that the number F of copies to be made is less than the set number C of sheets for checking (F<C), the operation for copying will be once terminated upon completion of the present copying control process. Therefore, the number F of copies to be made is temporarily used as a set number C of sheets for checking (S23) to execute step S15 and those following it. Upon completion of the execution, the set number C of sheets for checking is returned to the previous value. In this case, the calculation of the number of remaining sheets at step S19 may be performed by subtracting the number of copies made in the present copying process from the number of sheets remaining after the completion of the preceding copying process. It should be noted that when the power source of the image forming apparatus 100 is turned off, or when the paper storage part 50 is replenished with paper, the CPU 40 retains the data concerning the weight A of the paper support plate 12, the weight B of standard paper, and the set number C of sheets for checking, which have been stored in the memory unit 20, as they are until updating is performed. However, the first and second weight sensor measured values W1 and W2 are cleared.

In the above described example, if it is desired to update the paper remaining quantity by increasing the loop frequency for calculation of the paper remaining quantity, the set number C of sheets for checking should be changed from 50 to 20 or 10, for example, and set to such a value. If the set number C of sheets for checking is reduced, the updating cycle becomes faster, but weight sensors of high resolution are required because it is necessary to obtain a weight difference with a reduced number of sheets. On the other hand, if the loop frequency for the calculation need not be particularly high, the set number C of sheets for checking may be set to 100 or 200, for example. Consequently, it becomes possible to use weight sensors of low resolution and hence possible to reduce costs, favorably.

The embodiment of the present invention is arranged as described above. Thus, the control unit calculates the weight of paper actually used for every set number of sheets for checking and recalculates the number of sheets remaining in the paper storage part on the basis of the calculated weight of the paper. Therefore, even if different kinds of paper are mixedly used, the remaining quantity of paper can be calculated accurately. Hence, it is possible to judge accurately whether or not the remaining quantity of paper is adequate for the number of copies to be made. Accordingly, the present invention is free from a problem that might otherwise occur when the user leaves the place where the image forming apparatus is placed after setting and executing a copying operation for making a large number of copies, that is, the problem that when the user returns to the place, the desired copying operation may have undesirably been suspended because of a lack of paper.

What is claimed is:

1. A method of forming an image using an image forming apparatus, the method comprising:

storing sheets of paper for use in copying in a paper storage part;

detecting a weight of sheets of paper stored in said paper storage part;

counting sheets of paper fed for copying from said paper storage part setting a number of sheets for checking as a predetermined number of sheets of paper used to check a predetermined parameter concerning sheets of paper;

comparing weights of sheets of paper detected in said detecting step before and after counting a number of sheets of paper fed equal to said predetermined number of sheets to detect a decrease in weight of the sheets of paper;

calculating a weight per sheet of paper or per unit number of sheets of paper on a basis of the decrease in weight and said predetermined number of sheets;

designating a number of copies to be made;

calculating a number of remaining sheets of paper in said paper storage part on a basis of the weight per sheet of paper or per unit number of sheets of paper calculated in said weight calculating step and the weight of sheets of paper detected in said weight detecting step;

judging whether or not the number of remaining sheets of paper calculated in said calculating step is adequate for said number of copies to be made designated in said designating step on a basis of said number of remaining sheets of paper and said number of copies to be made;

storing a weight of standard paper, which is a weight per sheet of standard paper or per unit number of sheets of standard paper; and calculating a number of remaining sheets of paper stored in said paper storage part from said weight of sheets of paper detected in said weight detecting step and said weight of standard paper when a number of copies to be made is designated in said designating step at a time of starting.

2. The method according to claim 1, further comprising:

providing a warning when said judging step judges that said number of remaining sheets of paper is not adequate for said number of copies to be made.

3. The method according to claim 2, wherein said step of warning comprises providing a warning via at least one of a sound output or displaying a warning by an image.

4. The method according to claim 1, wherein the number of sheets for checking set in said setting step is changeable from outside of the apparatus.

5. The method according to claim 1, wherein when the number of copies to be made designated in said designating step is smaller than the number of sheets for checking set in said setting step, said number of copies to be made is set substitutionally in said setting step as said number of sheets for checking.

6. The image forming method according to claim 1, wherein said detecting step comprises detecting the weight of sheets of paper while the sheets are stored in said paper storage part.

7. A method of forming an image using an image forming apparatus, the method comprising:

storing sheets of paper for use in copying in a paper storage part;

detecting a weight of sheets of paper stored in said paper storage part using a weight detecting part;

counting sheets of paper fed for copying from said paper storage part;

setting a number of sheets for checking as a predetermined number of sheets of paper used to check a predetermined parameter concerning sheets of paper;

comparing weights of sheets of paper detected in said detecting step before and after counting a number of sheets of paper fed equal to said predetermined number of sheets to detect a decrease in weight of the sheets of paper;

calculating a weight per sheet of paper or per unit number of sheets of paper on a basis of the decrease in weight and said predetermined number of sheets;

wherein said weight detecting part comprises a weight sensor placed in a bottom of said paper storage part a paper support plate supported by said weight sensor and loaded with paper; and a weight calculating part for reading a weight of said paper support plate that has previously been stored in memory and for subtracting the weight of said paper support plate from a weight of paper detected with said weight sensor to determine the weight of paper.

8. An image forming apparatus comprising:

a paper storage means for storing sheets of paper for use in copying;

a weight detecting means for detecting a weight of sheets of paper stored in said paper storage means;

a paper feed counting means for counting sheets of paper fed for copying from said paper storage means;

a checking sheet number setting means for setting a number of sheets for checking as a predetermined number of sheets of paper used to check a predetermined parameter concerning sheets of paper; and a weight calculating means for comparing weights of sheets of paper detected by said weight detecting means before and after said paper feed counting means counts a number of sheets of paper fed equal to said number of sheets for checking to detect a decrease in weight of the sheets of paper, and for calculating a weight per sheet of paper or per unit number of sheets of paper on a basis of the decrease in weight and said number of sheets for checking, a designating means for designating a number of copies to be made;

a calculating means for calculating a number of remaining sheets of paper in said paper storage means on a basis of the weight per sheet of paper or per unit number of sheets of paper calculated by said weight calculating means and the weight of sheets of paper detected by said weight detecting means;

a judging means for judging whether or not the number of remaining sheets of paper calculated by said calculating means is adequate for said number of copies to be made designated by said designating means on a basis of said number of remaining sheets of paper and said number of copies to be made;

a memory means for storing a weight of standard paper, which is a weight per sheet of standard paper or per unit number of sheets of standard paper; and a calculating means for calculating a number of remaining sheets of paper stored in said paper storage means from said weight of sheets of paper detected by said weight detecting means and said weight of standard paper when a number of copies to be made is designated by said designating means at a time of starting.

9. An image forming apparatus according to claim 8, further comprising:

a warning display means for giving warning when said judging means judges that said number of remaining sheets of paper is not adequate for said number of copies to be made.

10. An image forming apparatus according to claim 9, wherein said warning display means includes at least either a sound output unit for giving warning by sound or a control panel for displaying warning by an image.

11. An image forming apparatus according to claim 8, wherein the number of sheets for checking set in said checking sheet number setting means is changeable from an outside.

12. An image forming apparatus according to claim 8, wherein when the number of copies to be made designated by said designating means is smaller than the number of sheets for checking set in said checking sheet number setting means, said number of copies to be made is set substitutionally in said checking sheet number setting means as said number of sheets for checking.

13. An image forming apparatus according to claim 8, wherein the weight detecting means for detecting a weight of sheets of paper stored in said paper storage means detects the weight of sheets of paper while the sheets are stored in said paper storage means.

14. An image forming apparatus comprising:

a paper storage means for storing sheets of paper for use in copying;

a weight detecting means for detecting a weight of sheets of paper stored in said paper storage means;

a paper feed counting means for counting sheets of paper fed for copying from said paper storage means;

a checking sheet number setting means for setting a number of sheets for checking as a predetermined number of sheets of paper used to check a predetermined parameter concerning sheets of paper; and a weight calculating means for comparing weights of sheets of paper detected by said weight detecting means before and after said paper feed counting means counts a number of sheets of paper fed equal to said number of sheets for checking to detect a decrease in weight of the sheets of paper, and for calculating a weight per sheet of paper per unit number of sheets of paper on a basis of the decrease in weight and said number of sheets for checking, wherein said weight detecting means comprises a weight sensor placed in a bottom of said paper storage part; a paper support plate supported by said weight sensor and loaded with paper; and a weight calculating means for reading a weight of said paper support plate that has previously been stored in memory and for subtracting the weight of said paper support plate from a weight of paper detected with said weight sensor to determine the weight of paper.

* * * * *